(12) United States Patent
Dorn

(10) Patent No.: US 7,809,963 B2
(45) Date of Patent: Oct. 5, 2010

(54) USER SPACE POWER CONTROLLER

(76) Inventor: William E. Dorn, 5s528 Arlington Ave., Naperville, IL (US) 60540

(\*) Notice: Subject to any disclaimer, the term of this patent is extended or adjusted under 35 U.S.C. 154(b) by 860 days.

(21) Appl. No.: 11/692,715

(22) Filed: Mar. 28, 2007

(65) Prior Publication Data

US 2008/0195880 A1 Aug. 14, 2008

Related U.S. Application Data

(60) Provisional application No. 60/900,887, filed on Feb. 12, 2007.

(51) Int. Cl.
*G06F 1/00* (2006.01)

(52) U.S. Cl. ............... 713/300; 315/149; 315/150; 315/152; 315/153; 315/155; 315/156; 315/157; 315/159

(58) Field of Classification Search ........... 713/300; 315/149, 150, 152, 153, 155, 156, 157, 159
See application file for complete search history.

(56) References Cited

U.S. PATENT DOCUMENTS

| | | |
|---|---|---|
| 2,967,981 A | 1/1961 | Wise |
| 4,048,812 A | 9/1977 | Thomason |
| 4,273,999 A | 6/1981 | Pierpoint |
| 4,701,669 A | 10/1987 | Head et al. |
| 5,237,168 A | 8/1993 | Giust et al. |
| 5,648,656 A | 7/1997 | Begemann et al. |
| 6,084,231 A | 7/2000 | Popat |
| 6,114,813 A | 9/2000 | Lo et al. |
| 6,522,078 B1* | 2/2003 | Okamoto et al. ............ 315/149 |
| RE38,036 E | 3/2003 | Neumann |
| 6,583,573 B2 | 6/2003 | Bierman |
| 6,969,955 B2 | 11/2005 | Erickson et al. |
| 6,990,394 B2 | 1/2006 | Pasternak |
| 7,045,968 B1 | 5/2006 | Bierman et al. |
| 7,111,952 B2 | 9/2006 | Veskovic |
| 7,190,126 B1* | 3/2007 | Paton ...................... 315/308 |
| 7,626,339 B2* | 12/2009 | Paton ...................... 315/155 |
| 7,657,763 B2* | 2/2010 | Nelson et al. ............. 713/300 |
| 2003/0062841 A1 | 4/2003 | Norling |
| 2005/0197184 A1* | 9/2005 | Ahlquist ..................... 463/29 |
| 2005/0231134 A1* | 10/2005 | Sid ........................ 315/294 |
| 2006/0120008 A1* | 6/2006 | Kreiner ................... 361/211 |
| 2007/0120653 A1* | 5/2007 | Paton ...................... 340/301 |
| 2007/0155349 A1* | 7/2007 | Nelson et al. ............. 455/128 |
| 2008/0043404 A1* | 2/2008 | Frankel ................... 361/600 |
| 2008/0067955 A1* | 3/2008 | Cunningham et al. ....... 315/307 |
| 2008/0106147 A1* | 5/2008 | Caggiano et al. ............ 307/39 |
| 2008/0143273 A1* | 6/2008 | Davidson et al. ........... 315/294 |

\* cited by examiner

*Primary Examiner*—Thomas Lee
*Assistant Examiner*—Jaweed A Abbaszadeh
(74) *Attorney, Agent, or Firm*—Husch Blackwell Sanders Welsh Katz

(57) ABSTRACT

A method and apparatus is provided for controlling power consuming devices within a user space. The method includes the steps of providing a plurality of power control devices where each power control device of the plurality of power control devices controls a power consuming device within the user space, a base station controlling a power level of the power controlling devices in accordance with a set of parameter provided by a user of the user space, a solar detector detecting a solar input proximate the user space and the base station adjusting a power level of the power control devices in accordance with the detected solar input.

14 Claims, 5 Drawing Sheets

Overall System Block Diagram

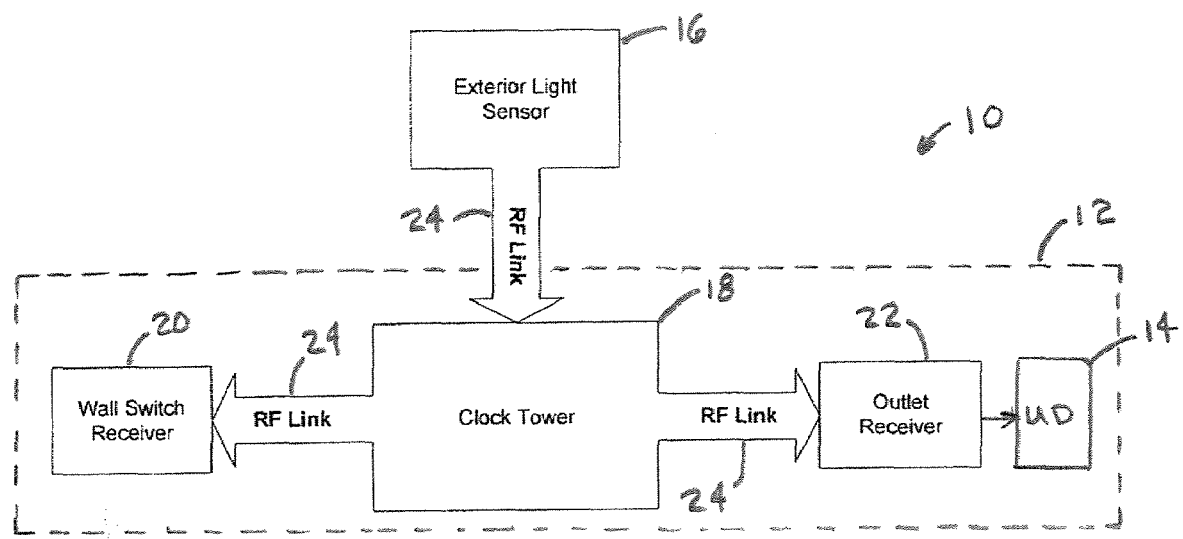
Figure 1: Overall System Block Diagram

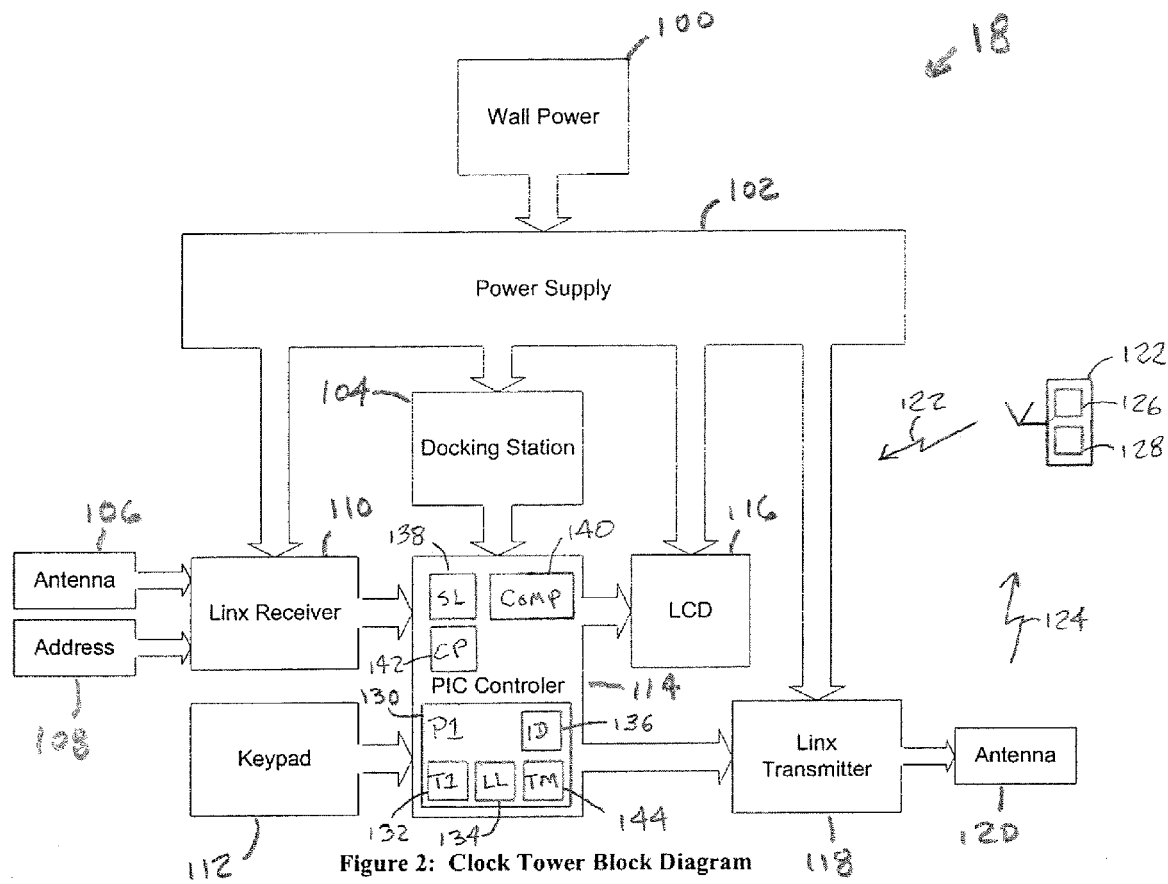
Figure 2: Clock Tower Block Diagram

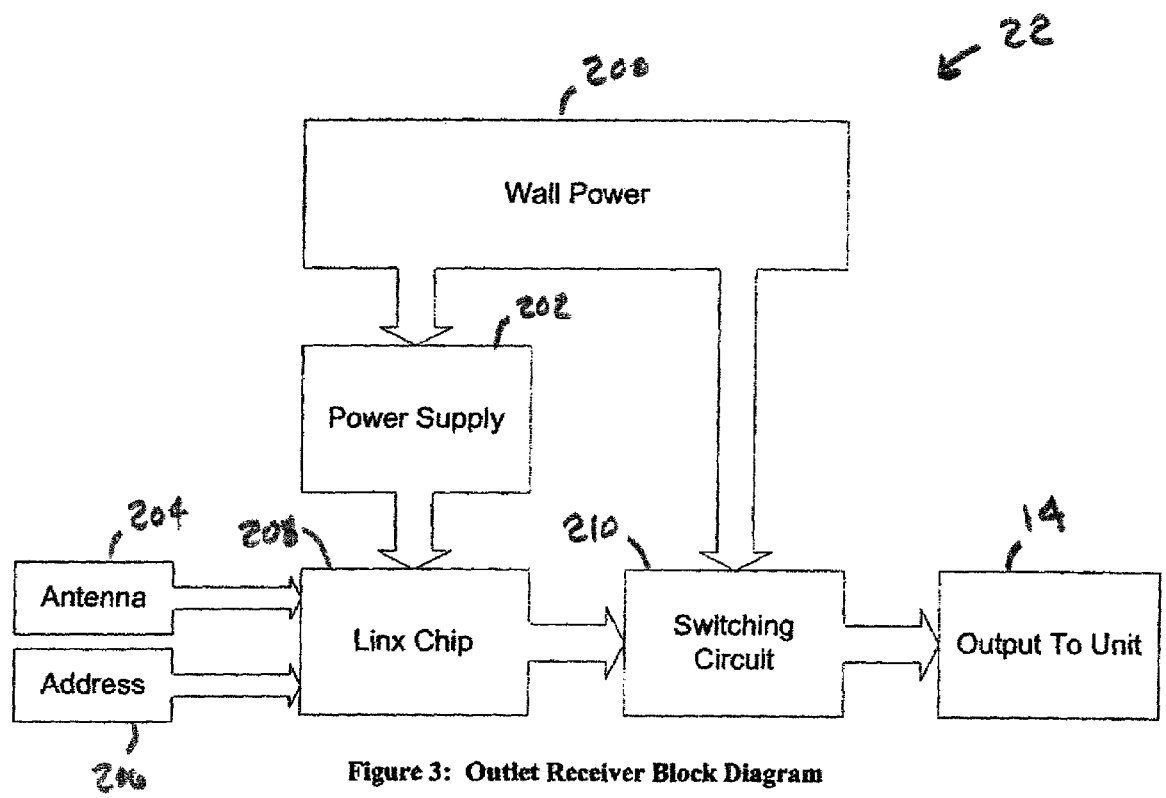
Figure 3: Outlet Receiver Block Diagram

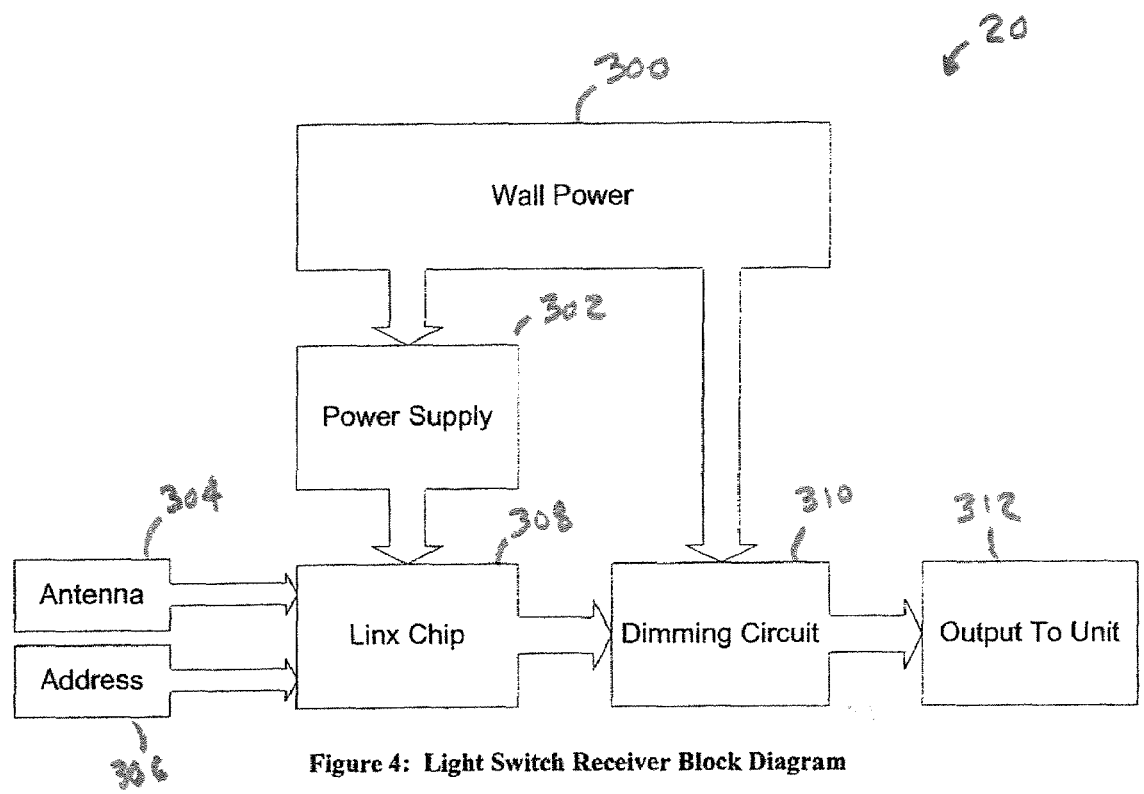
Figure 4: Light Switch Receiver Block Diagram

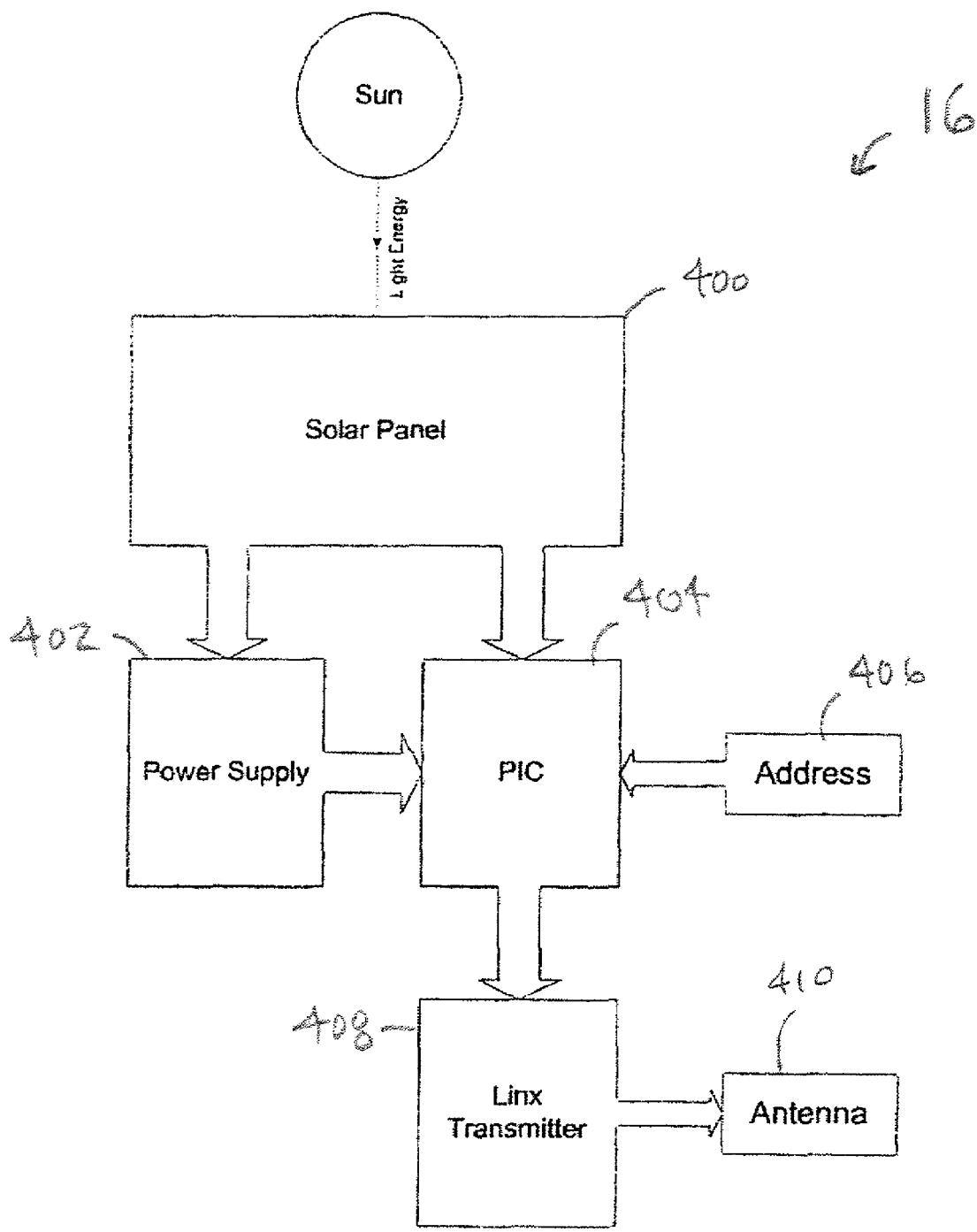
Figure 5: Exterior Light Sensor Block Diagram

USER SPACE POWER CONTROLLER

FIELD OF THE INVENTION

The field of the invention relates to user spaces and more particularly to devices for controlling power use in a user space.

BACKGROUND OF THE INVENTION

A user space may contain many different types of small power consuming devices and means for controlling those devices. The most common power consuming devices is lighting. Lighting is usually controlled through the use of a wall light switch or dimmer.

Alternately, a user space may contain small space heaters or window mounted air conditioners. Space heaters or window mounted air conditioners are typically plugged into wall outlets and controlled via a switch mounted on an exterior surface of the heater or air conditioner.

Other power consuming devices may include ceiling fans, coffee makers or water coolers. In each case, these devices are usually powered through wall outlets and integral ON/OFF switches.

Timers that plug into wall outlets are often used for controlling such power consuming devices in user spaces. Since such timers are plugged into wall outlets, they are limited to controlling only those devices that can, in turn, be plugged into the timer.

While timers are effective, they require constant maintenance. Often the time keeping mechanism in such devices is relatively inaccurate and typically gains or loses time after a short period of operation. Even where the devices are accurate, the time indicator on such devices makes it difficult to accurately determine activation and deactivation times.

Alternatively, where a timer is used to control a lamp or other lighting device, the change of seasons requires that an activation time be frequency adjusted. During the fall, the activation time must be frequently advanced and in the spring retarded. Accordingly, a need exists for a better means of controlling power consuming devices in user spaces.

SUMMARY

A method and apparatus is provided for controlling power consuming devices within a user space. The method includes the steps of providing a plurality of power control devices where each power control device of the plurality of power control devices controls a power consuming device within the user space, a base station controlling a power level of the power controlling devices in accordance with a set of parameter provided by a user of the user space, a solar detector detecting a solar input proximate the user space and the base station adjusting a power level of the power control devices in accordance with the detected solar input.

BRIEF DESCRIPTION OF THE DRAWINGS

FIG. 1 is a block diagram of a user device control system in accordance with an illustrated embodiment of the invention;

FIG. 2 is a block diagram of a base station of the system of FIG. 1;

FIG. 3 is a block diagram of an outlet controller that may be used by the system of FIG. 1;

FIG. 4 is a block diagram of a light switch controller that may be used by the system of FIG. 1;

FIG. 5 is a block diagram of a solar sensor that may be used by the system of FIG. 1.

DETAILED DESCRIPTION OF AN ILLUSTRATED EMBODIMENT

FIG. 1 depicts a user device control system 10 shown generally in accordance with an illustrated embodiment of the invention. The system 10 is used to control user devices 14 within a user space 12. As used herein, a user device is a device within a user space that is otherwise directly controlled by the user. User devices are typically small portable devices such as fans, space heaters, coffee makers or water coolers. One type of device that is a user device (even though not always portable) is lighting. In general, a user device is a device that receives power through a wall, floor or ceiling power source such as a power outlet or light control station (e.g., a light switch). As used herein, a user device is not a centrally controlled device such as a heating system or central air conditioner. However, a user device could be a window mounted air conditioner that receives power though a plug from an outlet.

The system 10 includes a base station 18 that controls power to user devices 14 based upon inputs from a number of sources. On the one hand, the system 10 may receive information about the user space 12 from a system manager. The system manager may enter information, such as the hours of normal use. The system manager may also enter information about how the user devices are to operate.

The system 10 may also receive information from a solar sensor 16. The information received from the solar sensor 16 may be used in any of a number of different ways. For example, information from the solar sensor 16 may be used to control artificial lighting during periods when the user space is occupied by people. For example, in a user space with many windows on the east side of the space, the system 10 may reduce artificial lighting on sunny mornings when a great deal of light enters through the windows and incrementally increase lighting in the afternoon. Alternatively, the solar sensor 16 may be used during periods of non-occupancy to control the ON and OFF periods of interior or security lighting or to deactivate user devices.

In general, the base station controls user devices 14 through a number of wall switch receivers 20 and/or outlet receivers 22. Communication between the base station 18 and the wall switch receivers (controllers) 20, the outlet receivers (controllers) 22 or the solar sensor is established through the use of an RF link 24. The RF link 24 may be established between the base station 18 and wall switch receivers 20, outlet receivers 22 or solar detector 16 via any of a number of commercially available chip sets (e.g., The Linx model TXE-418-KH transmitter/encoder, the Linx model RXD-418-KH receiver/decoder, etc.) and an associated antenna.

FIG. 2 is a block diagram of the base station 18. The base station may be based upon any general purpose microprocessor (e.g., PIC18F4420/PIC18F4520) 114. Power may be supplied to the controller 114 from a wall outlet 100 through a power supply 102 and docking station 104.

FIG. 3 is a block diagram of an outlet receiver 22. The outlet receiver 22 is provided in the form of a small box with a three-prong male plug on one side and a three prong female plug on the other.

When the outlet receiver 22 is plugged into a wall outlet 200, the interior circuitry is activated via a power supply 202 and communication with the base station 18 is enabled. Communications from the base station 18 will determine whether or not power is transferred to a connected load 14. If power is lost to the electrical outlet, or the outlet receiver 22 is unplugged or deactivated by the base station 18, the outlet receiver 22 becomes deactivated and any appliance plugged into the outlet receiver 22 enters on OFF state.

Control signals from the base station 18 is received by an antenna 204 and decoded within the Linx chip (e.g., an Linx model RXD-418-KH receiver/decoder) 208. The output of the Linx chip 208 is provided as an input to a SR latch (e.g., a CD4043 integrated circuit) 210. The output of the Linx chip 208 is either a set pulse which activates the outlet controller 22 to provide power to the user device 14 or a reset pulse that deactivates the outlet controller 22 thereby discontinuing power to the user device 14.

FIG. 4 is a block diagram of a light switch receiver 20. The light switch receiver 20 is provided as a module that fits into a standard light switch electrical box. In other words, the receiver 20 replaces a standard in-wall light switch. The light switch receiver 20 functions to provide ON/OFF switching and dimming for incandescent and ballast lighting. Power to the light switch receiver 20 is provided from the pre-existing electrical wiring 300 when in the ON state and from an internal rechargeable battery 302 when in the OFF state. In the ON state, the light switch receiver 20 receives a binary value from the base station which determines the power level for the circuit being controlled by the light switch receiver 20.

The light switch receiver 20 has an external switch that places the light switch receiver 20 in any one of three states. The first is a bypass mode that manually provides power to any connected load. The second is an AUTO mode that enables the internal circuitry to provide control from the base station 18. The third mode is a manual OFF state that deactivates the light switch receiver 20 and prevents any power from being transferred to a connected load.

Control signals from the base station 18 is received by an antenna 304 and decoded within the Linx chip (e.g., an Linx model RXD-418-KH receiver/decoder) 308. The output of the Linx chip 308 is provided as an input to a digital variable resistor (e.g., a Maxim DS1866 integrated circuit) within the dimming circuit 310. The digital variable resistor is placed in series with a second resistor to provide a voltage divider. The voltage divider is placed across the 120 volt AC wall supply of the preexisting wall wiring. The output voltage of the divider (i.e., from between the resistors) is provided as a control input to a diac/triac combination integrated circuit (e.g., an ECG 5646). The diac/triac integrated circuit is connected in series with a user device 14 across the 120 volt AC wall supply and provides a variable power output 312 to the user device 14.

The digital variable resistor within the dimmer circuit 310 receives a 3-bit digital value from the Linx chip 308. The 3-bit value represents an absolute power value. The 3-bit value provides seven levels of dimming from the dimmer circuit 310. A 3-bit value of 000 may represent on OFF state and a value of 111 may represent a full ON state.

FIG. 5 is a block diagram of the solar sensor 16. The operative parts of the solar sensor include a solar panel 400, a controller 404 and a transmitter 408.

The solar sensor 16 is typically powered by a battery 402. In addition to providing an indication of an ambient light level, the solar panel 400 may also function to charge the battery 402.

The solar sensor is located outside the space 12. Alternatively, a number of solar sensors 16 may be located within the space 12 adjacent a window and may be used to detect light levels at various locations within the space 12.

The solar sensor 16 may be operated by a microprocessor (e.g., a PIC18F4520) 404. A program within the processor 404 reads an analog output from the solar cell 400 every second based upon an input from the sun. The voltages read are stored as variables. Every 15 seconds, the values are averaged and a magnitude (e.g., a 4-bit binary value) of the solar radiation detected by the solar panel 400 is sent from the solar sensor 16 to the base station 18.

Communication between the base station 18 and any one of the outlet receiver 22, the wall switch receiver 20 and solar sensor 16 may be established by matching a code on opposing ends of RF links 24. For example, a first code (address 108) may be entered within the base station 18 for the outlet receiver 22 and a matching code (address 206) may be entered into the outlet receiver 22. Similarly, a second code (address 108) may be entered within the base station 18 for the light switch receiver 20 and a matching code (address 306) may be entered into the wall switch receiver 20 and a third code (address 108) may be entered within the base station 18 for the solar sensor 16 and a matching code (address 406) may be entered into the solar sensor 16.

The base station 18 may include a handheld controller 122. The handheld controller 122 allows the user to walk from room to room and make changes to the system 10. A display 116, 126 provides a visual reference that guides the user through the various programming menus. To enter data to the controller 18, a 16-button keypad 112, 128 may be provided for ease of entry of times, device addresses or other data. Since the portable controller 122 is portable, it is powered from a rechargeable battery that is charged when the portable device 122 is placed in a docking station 104. If the controller 122 is left off the docking station 104 for a time period greater than a charge life of the battery, the lighting system 10 may be disabled until the controller 122 is placed back into the docking station 104.

The base station 18 serves as the control unit for the system 10. A user may program the base station 18 based upon the purpose of the user space 12. In the case where the user space 12 is a home or office, a user may program the base station 18 to activate and deactivate the user devices 14 based upon time, ambient light or any of a number of other inputs.

For example, the user may desire to have a security light associated with his/her home or business that goes ON at dusk and OFF at dawn. In this case, the user may first enter an identifier of the appropriate light switch controller 20 through the handheld controller 122 or through a keypad 112 directly connected to the base station 18. The user may then select an ambient light threshold level for activating and deactivating a light associated with the light switch receiver 20. The user may save the identifier (i.e., an address) 134 of the light switch receiver 20 and the threshold trigger value (e.g., a 4-bits binary value) 132 within a device control file 130 that is, in turn, retained within a memory of the base station 18.

In normal operation, the base station 18 may periodically receive solar light levels from the sensor 16 and save the light levels in a light level file 138 located in memory. A device control program within the base station 18 may also periodically retrieve and process the device control files 130. In each case, the control program retrieves one or more trigger parameters from within the files 130 and uses the trigger parameters to determine whether to send a control command to a controller 20, 22.

In order to determine whether a control command is to be sent to a controller 20, 22, the control program may first identify the type of trigger parameter is involved and take steps to determine whether the trigger parameter has been exceeded. In the case of the file 130, the program may determine that the trigger value is an ambient light level and may transfer the trigger parameter to a comparator routine 140 that compares the threshold 132 with a light level within the file 136. When the light level 136 exceeds the threshold 132, the comparator 140 may set a flag that notifies the control program of the event. In response, the control program may transfer the file 130 to a communication processor 142.

The communication processor 142 may process the file 130 to determine the type of instruction to be sent to the controller 20. For example, if the comparator 140 had detected that the light level were larger than the threshold level 132, then the command to be sent to the controller 20 would be to deactivate the light. Similarly, if the comparator 140 had detected that the light level were smaller than the threshold level 132, then the command to be sent to the controller 20 would be to activate the light.

Once the communication processor 142 has determined the type of message to be sent to the controller 20, the communication processor 142 may compose the appropriate activation or deactivation instruction. The activation instruction may include the address of the light switch receiver 20 and an appropriate instruction to adjust a power level. In the case of the light switch controller 20, the controller 20 is constructed to receive a 3-bit power level value. However, in the case of a security light, the operating mode would usually be fully on or fully off. If the user did not enter a power level, then the default power level would be to switch between fully ON and fully OFF states. As such, if the light level where greater than the threshold level 132, then the composed instruction to the controller 20 would include at least the address of the controller 20 and a 3-bit power level of "000." The instruction is transferred to the transmitter 118 where it is transmitted through the antenna 120 to the light switch receiver 20. Similarly, if the light level where less than the threshold level 132, then the composed instruction to the controller 20 would include the address of the controller 20 and a 3-bit power level of "111."

In another example, such as that discussed above, a user may use the system 10 to reduce artificial lighting on the east side of a building during bright mornings and increase lighting in the afternoon. In this case, the user may use the portable controller 122 or keypad 112 to build a table of values for each light switch controller 20. The table of values may include a series of light levels on one side and a power level on the other side. As the light level detected by the solar sensor 16 changes during the day, the processor within the base station searches for a light level in the table that most closely matches the ambient light level. When the closest light level is found, the processor selects the power level associated with that light level and sends that power level to the light switch controller 20.

As another example, a user could use the solar detector 16 to detect human occupancy of the space. In this case, one or more of the solar detectors 16 may be located within the space. The user may use the portable controller 122 or keypad 112 to program the outlet sensors 22 to adjust a power level by deactivating any connected user device 14 when any occupant leaves the space 12 and shuts off the lights. In the case, the base station 18 may be programmed to operate under ANDed trigger functions (i.e., after 6 pm and the light level falls below some threshold value).

This example could be particularly useful in one's home. In this case, a solar detector 16 may be located in the bedroom of a user. In this case, solar sensor 16 may be used to detect a user turning on the bedroom light at a certain time (e.g., 11 pm) in anticipation of going to bed. In this case, the light switch controllers 20 and outlet controllers 22 may be programmed to deactivate any connected devices (e.g., a television, other interior lights, etc.) when the user turns off his bedroom light. In the case of lights, the base station 18 may send an OFF instruction that includes an address of the light switch controller 20 and a power level of "000." In the case of an outlet controller 22, the base station 18 would send an instruction that includes an address of the outlet controller 22 and a reset command.

A specific embodiment of a controller for a user space has been described for the purpose of illustrating the manner in which the invention is made and used. It should be understood that the implementation of other variations and modifications of the invention and its various aspects will be apparent to one skilled in the art, and that the invention is not limited by the specific embodiments described. Therefore, it is contemplated to cover the present invention and any and all modifications, variations, or equivalents that fall within the true spirit and scope of the basic underlying principles disclosed and claimed herein.

The invention claimed is:

1. A method of controlling power consuming devices within a user space, said method comprising:
   providing a plurality of power control devices where each power control device of the plurality of power control devices controls a power consuming device within the user space;
   a base station controlling a power level of the power controlling devices in accordance with a set of parameters provided by a user of the user space;
   retaining the set of parameters as a set of threshold trigger values into a set of device control files in the base station where each control file of the set of device control files corresponds to one of the plurality of power control devices;
   a solar detector periodically detecting a solar input value proximate the user space; and
   a processor within the base station comparing the periodically detected solar input value with the threshold trigger values of the respective device control files and adjusting a power level of the respective power control devices in accordance with the detected solar input.

2. The method of controlling power consuming devices as in claim 1 further comprising providing a radio frequency interface that connects the solar detector and central controller.

3. The method of controlling power consuming devices as in claim 1 further comprising a portable controller programming the base station.

4. The method of controlling power consuming devices as in claim 1 wherein the power control devices further comprise an outlet power controller that detachably plugs into a wall outlet and that has a female outlet that receives a male plug of a power consuming device.

5. The method of controlling power consuming devices as in claim 4 further comprising the base station controlling the outlet power controller via an rf interface.

6. The method of controlling power consuming devices as in claim 1 further comprising disposing a light switch power controller within a wall light switch enclosure.

7. The method of controlling power consuming devices as in claim 6 further comprising the base station controlling the light switch power controller via an rf interface.

8. An apparatus for controlling power consuming devices within a user space comprising:
   a plurality of power control devices where each power control device of the plurality of power control devices controls a power consuming device within the user space;

a base station that controls a power level of the power controlling devices in accordance with a set of parameter provided by a user of the user space;

a set of control files within the base station containing a set of trigger threshold values associated with the set of parameters where each control file of the set of control files corresponds to one of the plurality of power control devices;

a solar detector that periodically detects a light input value proximate the user space; and a processor within the base station that compares the periodically detected solar input value with the threshold values of the respective control files, wherein the processor of the base station adjusts a power level of the respective power control devices in accordance with the detected light input.

9. The apparatus for controlling power consuming devices as in claim 8 further comprising providing a radio frequency interface that connects the solar detector and central controller.

10. The apparatus for controlling power consuming devices as in claim 8 further comprising a portable controller that programs the base station.

11. The apparatus for controlling power consuming devices as in claim 8 wherein the power control devices further comprise an outlet power controller that detachably plugs into a wall outlet and that has a female outlet that receives a male plug of a power consuming device.

12. The apparatus for controlling power consuming devices as in claim 11 further comprising the base station controlling the outlet power controller via an rf interface.

13. The of apparatus for controlling power consuming devices as in claim 8 further comprising a light switch power controller disposed within a wall light switch enclosure.

14. The apparatus for controlling power consuming devices as in claim 13 further comprising the base station controlling the light switch power controller via an rf interface.

* * * * *